United States Patent
Dege

(10) Patent No.: US 11,214,353 B2
(45) Date of Patent: Jan. 4, 2022

(54) WING ARRANGEMENT FOR AN AIRCRAFT AND AIRCRAFT

(71) Applicant: Airbus Operations GmbH, Hamburg (DE)

(72) Inventor: Saskia Dege, Bremen (DE)

(73) Assignee: AIRBUS OPERATIONS GmbH, Hamburg (DE)

(*) Notice: Subject to any disclaimer, the term of this patent is extended or adjusted under 35 U.S.C. 154(b) by 439 days.

(21) Appl. No.: 16/427,906

(22) Filed: May 31, 2019

(65) Prior Publication Data

US 2019/0367155 A1    Dec. 5, 2019

(30) Foreign Application Priority Data

Jun. 1, 2018   (DE) .................. 10 2018 113 161.5

(51) Int. Cl.
*B64C 3/56* (2006.01)

(52) U.S. Cl.
CPC ........................ *B64C 3/56* (2013.01)

(58) Field of Classification Search
CPC ............. B64C 13/28; B64C 3/56; B64C 3/54; B64C 1/30; B64C 3/00; B64C 3/42; B64C 5/08;
(Continued)

(56) References Cited

U.S. PATENT DOCUMENTS 262,451 A * 8/1882 McFarlane ............. B62D 7/023
280/137.504

1,348,374 A * 8/1920 Plym .................. B64C 3/00
244/123.8
(Continued)

FOREIGN PATENT DOCUMENTS

DE   10 2015 014 635         5/2017
EP       2 955 103           12/2015
(Continued)

OTHER PUBLICATIONS

Translation Certificate and English Translation of German Search Report issued in DE 10 2018 113 161.5, dated Mar. 12, 2019, 8 pages.
German Search Report for DE 10 2018 113 161.5 dated Mar. 12, 2019, 7 pages.
(Continued)

*Primary Examiner* — Medhat Badawi
(74) *Attorney, Agent, or Firm* — Nixon & Vanderhye P.C.

(57) ABSTRACT

A wing arrangement for an aircraft is disclosed including a wing having a fixed wing portion and a wing tip portion, wherein a the wing tip portion is pivotably connected to the fixed wing portion such that the wing tip portion is selectively pivotable about a pivot axis relative to the fixed wing portion between a first wing tip portion position and a wing tip portion second position, an actuator having an output element adapted to transfer an actuating torque and/or force to the wing tip portion for actuating the wing tip portion for movement about the pivot axis. The output element is movable between a first actuator position and a second actuator position, a first end stop for preventing movement of the wing tip portion beyond the first wing tip portion position, a detector adapted to detect a position of the output element, and a control unit adapted to control the actuating torque and/or force of the actuator based on the detected position of the output element.

14 Claims, 3 Drawing Sheets

(58) Field of Classification Search
CPC ........... B64C 5/10; B64C 23/65; B64C 23/72; Y02T 50/30; Y02T 50/10
See application file for complete search history.

(56) References Cited

U.S. PATENT DOCUMENTS

| | | | | |
|---|---|---|---|---|
| 1,779,113 A * | 10/1930 | Carns | B64C 9/00 244/123.9 |
| 1,803,030 A * | 4/1931 | Messerschmitt | B64C 3/00 244/123.8 |
| 1,804,823 A * | 5/1931 | Blondin | B64C 3/00 244/123.1 |
| 1,806,586 A * | 5/1931 | Christmas | B64C 3/00 244/123.4 |
| 1,819,794 A * | 8/1931 | Maxf | B64C 3/56 244/49 |
| 1,956,823 A * | 5/1934 | Carns | B64C 3/00 244/123.4 |
| 2,222,997 A * | 11/1940 | Bellanca | B64C 3/54 244/90 R |
| 2,289,224 A * | 7/1942 | Anderson | B64C 3/56 244/49 |
| 2,292,613 A * | 8/1942 | Chapman | B64C 3/54 244/218 |
| 2,375,075 A * | 5/1945 | Carruth | B64D 47/06 362/470 |
| 2,420,433 A * | 5/1947 | Kraaymes | B64C 3/54 244/218 |
| 2,468,425 A * | 4/1949 | Carpenter | B64C 3/56 74/520 |
| 2,712,421 A * | 7/1955 | Naumann | B64C 3/56 244/49 |
| 2,719,682 A * | 10/1955 | Handel | B64C 3/56 244/49 |
| 2,881,989 A * | 4/1959 | Flettner | B64C 27/26 244/6 |
| 2,881,994 A * | 4/1959 | Michael | B64C 3/26 244/124 |
| 3,039,721 A * | 6/1962 | Rogers, Jr. | B64D 37/04 244/135 R |
| 3,139,248 A * | 6/1964 | Alvarez-Calderon | B64C 3/42 244/207 |
| 3,333,792 A * | 8/1967 | Alvarez-Calderon | B64C 3/54 244/218 |
| 3,645,477 A * | 2/1972 | Kratschmar | B64C 3/40 244/46 |
| 3,737,121 A * | 6/1973 | Jones | B64C 3/40 244/13 |
| 4,061,195 A * | 12/1977 | Pryor | A01B 73/044 172/456 |
| 4,109,885 A * | 8/1978 | Pender | B64C 21/06 244/7 R |
| 4,228,977 A * | 10/1980 | Tanaka | A63H 27/08 244/153 R |
| 4,245,804 A * | 1/1981 | Ishimitsu | B64C 23/069 244/91 |
| 4,247,062 A * | 1/1981 | Brueckner | B64C 5/08 244/36 |
| 4,247,063 A * | 1/1981 | Jenkins | B64C 5/08 244/91 |
| 4,457,479 A * | 7/1984 | Daude | B64C 5/08 244/203 |
| 4,497,461 A * | 2/1985 | Campbell | B64C 9/00 244/99.3 |
| 4,598,885 A * | 7/1986 | Waitzman | B64C 23/076 244/13 |
| 4,671,470 A * | 6/1987 | Jonas | B29C 66/54 244/119 |
| 4,671,473 A * | 6/1987 | Goodson | B64C 23/076 244/199.4 |
| 4,717,093 A * | 1/1988 | Rosenberger | F42B 10/16 244/49 |
| 4,722,499 A * | 2/1988 | Klug | B64C 23/076 244/199.4 |
| 4,824,053 A * | 4/1989 | Sarh | B23Q 1/601 244/218 |
| 4,881,700 A * | 11/1989 | Sarh | B60F 5/02 244/2 |
| 4,986,493 A * | 1/1991 | Sarh | B60F 5/02 244/2 |
| 5,040,747 A * | 8/1991 | Kane | B64C 25/26 244/102 R |
| 5,072,894 A * | 12/1991 | Cichy | B64C 5/08 244/91 |
| 5,201,479 A * | 4/1993 | Renzelmann | B64C 3/56 244/49 |
| 5,229,921 A * | 7/1993 | Bohmer | G06F 1/1679 16/324 |
| 5,288,037 A * | 2/1994 | Derrien | B64C 25/26 244/102 SL |
| 5,288,039 A * | 2/1994 | DeLaurier | B64C 33/02 244/219 |
| 5,310,138 A * | 5/1994 | Fitzgibbon | B64C 3/56 244/49 |
| 5,348,253 A * | 9/1994 | Gratzer | B64C 23/069 244/91 |
| 5,350,135 A * | 9/1994 | Renzelmann | B64C 3/56 244/49 |
| 5,356,094 A * | 10/1994 | Sylvain | B64C 3/56 244/123.9 |
| 5,379,969 A * | 1/1995 | Marx | B64C 3/56 244/49 |
| 5,381,986 A * | 1/1995 | Smith | B64C 3/56 244/49 |
| 5,407,153 A * | 4/1995 | Kirk | B64C 23/069 244/199.4 |
| 5,427,329 A * | 6/1995 | Renzelmann | B64C 3/56 244/49 |
| 5,558,299 A * | 9/1996 | Veile | B64C 3/56 244/49 |
| 5,645,250 A * | 7/1997 | Gevers | B64D 27/00 244/101 |
| 5,988,563 A * | 11/1999 | Allen | B64C 3/56 244/49 |
| 6,076,766 A * | 6/2000 | Gruensfelder | B64C 3/56 244/130 |
| 6,190,484 B1 * | 2/2001 | Appa | B29C 70/32 156/189 |
| 6,224,012 B1 * | 5/2001 | Wooley | B60F 5/02 244/121 |
| 6,227,487 B1 * | 5/2001 | Clark | B64C 23/072 244/99.12 |
| 6,260,799 B1 * | 7/2001 | Russ | B64C 3/56 244/49 |
| 6,345,790 B1 * | 2/2002 | Brix | B64C 23/076 244/199.4 |
| 6,834,835 B1 * | 12/2004 | Knowles | B64C 3/54 244/198 |
| 7,137,589 B2 * | 11/2006 | Arata | B64C 27/26 244/6 |
| 7,497,403 B2 * | 3/2009 | McCarthy | B64C 23/072 244/199.4 |
| 8,089,034 B2 * | 1/2012 | Hammerquist | B64C 3/56 244/3.28 |
| 8,276,842 B2 * | 10/2012 | Kracke | B64C 13/28 244/99.4 |
| 8,651,431 B1 * | 2/2014 | White | B64C 23/076 244/218 |
| 8,733,692 B2 * | 5/2014 | Kordel | B64C 23/072 244/49 |
| 8,777,153 B2 * | 7/2014 | Parker | B64C 3/56 244/49 |
| 8,919,703 B2 * | 12/2014 | Parker | B64C 7/00 244/215 |
| 8,998,132 B2 * | 4/2015 | Burris | B64C 9/04 244/99.3 |
| 9,162,755 B2 * | 10/2015 | Guida | B64C 23/076 244/199.4 |
| 9,211,946 B2 * | 12/2015 | Good | B64C 3/56 |

(56) References Cited

U.S. PATENT DOCUMENTS

| | | | |
|---|---|---|---|
| 9,296,469 B2* | 3/2016 | Santini | B64C 3/56 |
| 9,415,857 B2* | 8/2016 | Fox | B64C 3/56 |
| 9,469,391 B1* | 10/2016 | Dong | B64C 23/076 |
| 9,469,392 B2* | 10/2016 | Fox | B64C 23/072 |
| 9,701,392 B2* | 7/2017 | Whitlock | B64C 3/26 |
| 9,896,186 B2* | 2/2018 | Fong | B29C 70/222 |
| 9,908,612 B2* | 3/2018 | Fox | B64C 3/56 |
| 9,914,523 B2* | 3/2018 | Good | B64C 3/56 |
| 10,189,557 B2* | 1/2019 | Boye | B64C 3/56 |
| 10,501,167 B2* | 12/2019 | Kracke | B64C 3/56 |
| 11,066,148 B2* | 7/2021 | Elenbaas | B64C 13/34 |
| 2003/0155839 A1 | 8/2003 | Krimmer | H01F 7/1607 310/264 |
| 2004/0000619 A1* | 1/2004 | Barriety | B64C 3/52 244/219 |
| 2004/0262451 A1* | 12/2004 | McLean | B64C 3/10 244/45 R |
| 2005/0133672 A1* | 6/2005 | Irving | B64C 23/072 244/201 |
| 2005/0230531 A1* | 10/2005 | Horinouchi | B64C 3/40 244/47 |
| 2005/0276657 A1* | 12/2005 | Yumikino | A61F 5/0125 403/92 |
| 2007/0018049 A1* | 1/2007 | Stuhr | B64C 23/069 244/124 |
| 2007/0262207 A1* | 11/2007 | Morgenstern | B64C 9/22 244/214 |
| 2008/0191099 A1* | 8/2008 | Werthmann | B64C 23/065 244/199.4 |
| 2008/0308683 A1* | 12/2008 | Sankrithi | B64C 23/076 244/199.4 |
| 2009/0148302 A1* | 6/2009 | Leahy | B64C 27/463 416/224 |
| 2009/0166477 A1* | 7/2009 | Bousfield | B64C 3/18 244/218 |
| 2009/0200423 A1* | 8/2009 | Tucker | B64C 3/26 244/123.1 |
| 2009/0224107 A1* | 9/2009 | McLean | B64C 23/069 244/199.4 |
| 2009/0302151 A1* | 12/2009 | Holmes | B64C 3/56 244/49 |
| 2010/0001678 A1* | 1/2010 | Potter | G05B 19/0421 318/569 |
| 2010/0019080 A1* | 1/2010 | Schweighart | B64C 3/56 244/49 |
| 2010/0051742 A1* | 3/2010 | Schweighart | B64C 3/56 244/49 |
| 2010/0084516 A1* | 4/2010 | Eberhardt | B64C 23/072 244/218 |
| 2011/0180657 A1* | 7/2011 | Gionta | B64C 3/56 244/49 |
| 2012/0032023 A1* | 2/2012 | Bousfield | B64C 3/56 244/49 |
| 2012/0112005 A1* | 5/2012 | Chaussee | B64C 23/072 244/123.1 |
| 2012/0292436 A1* | 11/2012 | Karem | B64C 3/56 244/49 |
| 2013/0001367 A1* | 1/2013 | Boer | B64C 23/072 244/199.3 |
| 2013/0056579 A1* | 3/2013 | Schlipf | B64C 3/56 244/49 |
| 2013/0092111 A1* | 4/2013 | Hioka | F01L 13/0021 123/90.15 |
| 2013/0099060 A1* | 4/2013 | Dees | B64C 3/56 244/199.4 |
| 2014/0014768 A1* | 1/2014 | Lassen | B64C 3/56 244/49 |
| 2014/0361539 A1* | 12/2014 | Carter | F03D 7/06 290/44 |
| 2015/0014478 A1* | 1/2015 | Lassen | B64C 3/56 244/49 |
| 2015/0097087 A1* | 4/2015 | Sakurai | B64C 3/40 244/201 |
| 2015/0191243 A1* | 7/2015 | Fujimoto | B64C 17/00 244/7 R |
| 2015/0210390 A1* | 7/2015 | Gad | B64D 1/12 244/137.3 |
| 2015/0360769 A1* | 12/2015 | Dege | B64C 13/505 244/213 |
| 2015/0360770 A1* | 12/2015 | Good | B64D 45/0005 244/199.3 |
| 2016/0090170 A1* | 3/2016 | Thompson | B64C 3/56 701/3 |
| 2016/0185444 A1* | 6/2016 | Gionta | B64C 35/008 244/49 |
| 2016/0244145 A1* | 8/2016 | Thompson | B64C 23/072 |
| 2016/0251075 A1* | 9/2016 | Thompson | B64C 23/072 244/198 |
| 2016/0332723 A1* | 11/2016 | Korya | B64C 3/56 |
| 2017/0029089 A1* | 2/2017 | Alexander | B64C 3/40 |
| 2017/0043864 A1* | 2/2017 | Axford | B64C 3/56 |
| 2017/0349296 A1* | 12/2017 | Moy | B64C 3/56 |
| 2017/0355438 A1* | 12/2017 | Bishop | B64C 3/56 |
| 2017/0355444 A1* | 12/2017 | Lorenz | B64C 3/56 |
| 2018/0057144 A1* | 3/2018 | Lorenz | B64C 3/56 |
| 2018/0237127 A1* | 8/2018 | Hewson | B64C 3/187 |
| 2019/0002083 A1* | 1/2019 | Wilson | B64C 3/546 |
| 2019/0152578 A1* | 5/2019 | Dege | G06F 30/20 |
| 2019/0152579 A1* | 5/2019 | Dege | B64C 3/56 |
| 2019/0152580 A1* | 5/2019 | Dege | B64C 3/56 |
| 2019/0152624 A1* | 5/2019 | Dege | G06F 17/00 |
| 2019/0248468 A1* | 8/2019 | Lorenz | B64C 3/56 |
| 2019/0322351 A1* | 10/2019 | Lorenz | F16D 55/38 |
| 2019/0337605 A1* | 11/2019 | Lorenz | B64C 3/56 |
| 2019/0359311 A1* | 11/2019 | Lorenz | B64C 3/56 |
| 2019/0359312 A1* | 11/2019 | Lorenz | B64C 3/56 |
| 2019/0367154 A1* | 12/2019 | Weder | B64C 3/56 |
| 2019/0367155 A1* | 12/2019 | Dege | B64C 3/56 |
| 2019/0389559 A1* | 12/2019 | Lorenz | B64C 3/56 |
| 2020/0023938 A1* | 1/2020 | Dege | B64C 3/56 |
| 2020/0398969 A1* | 12/2020 | Lorenz | B64C 3/56 |

FOREIGN PATENT DOCUMENTS

| | | |
|---|---|---|
| WO | 2015/162399 | 10/2015 |
| WO | 2017/118832 | 7/2017 |

* cited by examiner

WING ARRANGEMENT FOR AN AIRCRAFT AND AIRCRAFT

CROSS REFERENCE TO RELATED APPLICATION

This application claims priority to and incorporates by reference German Application Number DE 10 2018 113161.5, filed Jun. 1, 2018.

BACKGROUND

1. Field of the Invention

The present disclosure relates to a wing arrangement for an aircraft, and an aircraft comprising such a wing arrangement.

2. Description of Related Art

Such wing arrangements are also known as foldable wings and are developed to reduce the wingspan and thereby the space requirements of the aircraft during ground operation, for example at airports. Furthermore, such wing arrangements enable equipping existing aircraft families or newly designed aircrafts with wings with larger wingspans. This leads to an optimized fuel burn and to reduced airport fees compared to conventional wings.

A wing arrangement comprises a wing having a fixed wing portion, with a first end portion, which is secured to the fuselage of the aircraft, and an opposite second end portion, and a wing tip portion, which can also be described as a foldable wingtip, with a third end portion and an opposite fourth end portion, wherein the third end portion is pivotably connected to the second end portion such that the wing tip portion is selectively pivotable about a pivot axis relative to the fixed wing portion between a first wing tip portion position and a second wing tip portion position, wherein the first wing tip portion position is one of an extended position and a folded or stowed position, in which the spanwise length of the wing is smaller than in the extended position, and the second wing tip portion position is the other one of the extended position and the folded position. To position the wing tip portion reliably in the first wing tip portion position, an actuator drives the wing tip portion into the first wing tip portion position and against a first end stop of the wing arrangement.

SUMMARY

A compact, space and weight optimized wing arrangement is disclosed.

The aircraft wing arrange comprises a wing having a fixed wing portion, with a first end portion, which is adapted to be secured to the fuselage of the aircraft, and an opposite second end portion, and a wing tip portion with a third end portion and an opposite fourth end portion, wherein the third end portion is pivotably connected to the second end portion such that the wing tip portion is selectively pivotable about a pivot axis relative to the fixed wing portion between a first wing tip portion position and a second wing tip portion position, wherein the first wing tip portion position is one of an extended position and a folded position, in which the spanwise length of the wing is smaller than in the extended position, and the second wing tip portion position is the other one of the extended position and the folded position, an actuator comprising an output element adapted to transfer an actuating torque and/or force to the wing tip portion for actuating the wing tip portion for movement about the pivot axis, wherein the output element is movable between a first actuator position, in which the wing tip portion is in the first wing tip portion position, and a second actuator position, in which the wing tip portion is in the second wing tip portion position, a first end stop for preventing movement of the wing tip portion beyond the first wing tip portion position, a detector adapted to detect a position of the output element, and a control unit adapted to control the actuating torque and/or force of the actuator based on the detected position of the output element, such that the actuating torque and/or force has a value smaller than or equal to a first level when the position of the output element is in a range from the first actuator position to a third actuator position, which is located between the first and second actuator positions, and that the actuating torque and/or force has a value greater than or equal to a second level higher than the first level when the position of the output element is between the third actuator position and the second actuator position or when the position of the output element is the second actuator position or when the position of the output element is between the third actuator position and a fourth actuator position located between the second and third actuator positions. This means, the control unit can control the actuating torque and/or force of the actuator such that the actuating torque and/or force is reduced when the wing tip portion is positioned at the or close to the first wing tip portion position. Therefore, the torque and/or force acting on the components of the wing arrangement is reduced in the situation when the first end stop prevents the movement of the wing tip portion beyond the first wing tip portion position, i.e. when the wing tip portion is positioned against the end stop to achieve a certain position accuracy for the aircrafts ground and/or flight performance and/or for the latching function. Thereby, the components of the wing arrangement and the wing arrangement itself can be designed in a more compact and space and weight optimized way.

The configuration that the wing tip portion is selectively pivotable about a pivot axis relative to the fixed wing portion between a first wing tip portion position and a wing tip portion second position means that the wing tip portion is selectively pivotable about the pivot axis relative to the fixed wing portion from the first wing tip portion position to the second wing tip portion position as well as from the second wing tip portion position to the first wing tip portion position. Similarly, if a component, e.g. the output element, is movable between a corresponding first and second actuator position, component may be movable from the corresponding first actuator position to the corresponding second actuator position as well as from the corresponding second actuator position to the corresponding first actuator position.

Usually, the wing tip portion, e.g. the foldable wing tip or the movable part of the wing, is driven from the fully extended position, i.e. the extended position, to the fully retracted position, i.e. the folded position, and vice versa according to selection. In the extended position, the wing tip portion may extend as a continuous extension of the fixed wing portion in a common plane with the fixed wing portion.

The wing arrangement may be configured such that the wing tip portion, i.e. the movable part of the wing, is rotated or pivoted about the pivot axis, especially a vertical axis, into the folded position which may be leading to a folded position, in which the wing tip portion extends rearwards. Alternatively, the wing arrangement may be configured such that the wing tip portion is pivoted in a pivoting motion around the pivot axis, especially a hinge line, oriented in the direction of flight which may be leading to a folded position, in which the wing tip portion extends upwards. In other words, the pivot axis may be oriented substantially perpendicular to the wingspan direction of the wing and/or substantially in the direction of flight (of the wing/aircraft) and/or substantially perpendicular to the direction of flight (of the wing/aircraft). Specifically, when the wing tip portion is foldable upwardly, the pivot axis extends in a horizontal plane and/or in parallel to the wing surface. Alternatively, when the wing tip portion is foldable rearwardly, the pivot axis extends in a vertical direction and/or in a wing depth direction and/or in a direction perpendicular to the wing surface. In any case, in the folded position, the overall span of the aircraft is reduced compared to the extended position, because the spanwise length of the wing is smaller in the folded position compared to the extended position.

The first wing tip portion position may be in the folded position and that the second wing tip portion position is the extended position. However, the first wing tip portion position may be in the extended position and that the second wing tip portion position is the folded position.

Further, the actuator may be configured to actuate the wing tip portion for movement about the pivot axis between the first wing tip portion position and the second wing tip portion position. The actuator may be a rack and pinion drive or a linear or hydraulic actuator. Alternatively, the actuator may be a hydraulically or electrically driven rotational gearbox. For example, the actuator may comprise a motor and a transmission component. Furthermore, the motor and the transmission component may be coupled such that the output element can transfer the actuating torque and/or force to the wing tip portion. Alternatively, the actuator can comprise the motor and a structural kinematic link, wherein the motor and the structural kinematic link are coupled such that the output element can transfer the actuating torque and/or force to the wing tip portion. Moreover, the actuator can comprise the motor, a transmission component, and a structural kinematic link, wherein the motor, the transmission component, and the structural kinematic link are coupled such that the output element can transfer the actuating torque and/or force to the wing tip portion. Such arrangements provide simple and modularly built wing arrangements, which provide simple replacement of spare parts. In particular, the motor may be a hydraulic motor, especially a variable displacement hydraulic motor or a flow or pressure control hydraulic motor, or an electric motor, such as, in particular, an electric motor configured to activate and deactivate spools or configured to be voltage controlled. The transmission component may be a gearbox or a shaft. Alternatively, the transmission component may also comprise a gearbox and/or multiple gearboxes and/or a shaft and/or multiple shafts. For example, the actuator may be mounted between the fixed wing portion and the wing tip portion near the pivot axis.

It should be noted that the configuration may be such that when moving the output element from the second actuator position into the first actuator position, the wing tip portion reaches the first wing tip portion position and further movement of the wing tip portion is stopped by the first end stop before—and shortly before—the output element may reach the first actuator position. In other words, during the last portion of the movement from the second actuator position into the first actuator position the wing tip portion is already in the first wing tip portion position, i.e. abuts the first end stop and no longer moves, and an increasing load is applied to the first end stop upon further movement of the output element into the first actuator position. Similarly, the configuration may be such that when moving the output element from the first actuator position into the second actuator position, the wing tip portion reaches the second wing tip portion position and further movement of the wing tip portion is stopped by a second end stop before—and shortly before—the output element may reach the second actuator position. In other words, during the last portion of the movement from the first actuator position into the second actuator position the wing tip portion is already in the second wing tip portion position, i.e. abuts the second end stop and no longer moves, and an increasing load is applied to the second end stop upon further movement of the output element into the second actuator position.

In particular, the first end stop may be mounted to the second end portion. Alternatively, the first end stop may be mounted to the third end portion. The second end stop may be mounted to the second end portion. Alternatively, the second end stop may be mounted to the third end portion. Hereby, different mounting positions are provided for wing arrangements of different construction and function.

The detector may be an adapted to detect or monitor the position of the output element and/or a position of the wing tip portion and/or a force acting between the first end stop and the wing tip portion and/or a force acting between the second end stop and the wing tip portion. For example, the detector may be adapted to detect the position of the output element directly. Alternatively or additionally, the detector may be adapted to detect the position of the output element indirectly, for example, by detecting a position of the wing tip portion and/or by detecting a force acting between the first end stop and the wing tip portion and/or by detecting a force acting between a second end stop and the wing tip portion. In any case, the position of the output element relates to the position of the wing tip portion such that the position of the wing tip portion can be determined based on the position of the output element. For example, when the output element is in the first actuator position, the wing tip portion is in the first wing tip portion position, and when the output element is in the second actuator position, the wing tip portion is in the second wing tip portion position.

Furthermore, the position of the output element and/or the position of the wing tip portion may be detected continuously during movement of the output element between the first actuator position and the second actuator position and/or during movement of the wing tip portion between the first wing tip portion position and the second wing tip portion position, respectively. Alternatively or additionally, the position of the output element and/or the position of the wing tip portion may only be detected in certain areas. For example, the position of the output element may be detected by determining whether the output element is between the first actuator position and a third actuator position and/or whether the output element is between the first actuator position and a fourth actuator position and/or whether the output element is between the second actuator position and the third actuator position and/or whether the output element is between the second actuator position and the fourth actuator position and/or whether the output element is between the third actuator position and the fourth actuator position. Alternatively or additionally, the position of the wing tip portion may be detected by determining whether the wing tip portion is between the first wing tip portion position and the third wing tip portion position and/or whether the wing tip portion is between the first wing tip portion position and a wing tip portion fourth position and/or whether the wing tip portion is between the second wing tip portion position and the third wing tip portion position and/or whether the wing tip portion is between the second wing tip portion position and the fourth wing tip portion position and/or whether the wing tip portion is between the third wing tip portion position and the fourth wing tip portion position.

Alternatively or additionally, the detector detects or monitors the position of the output element relative to the first and/or second end stop and/or the position of the wing tip portion relative to the first and/or second end stop. The detector may comprise a motor position pick up unit or any other system or structure position pick up unit for the detection of the positions and/or forces. The detected positions and/or forces may be used as feedback. A feedback signal comprising information of the positions and/or forces may be sent from the detector to the control unit.

The detection of a position may mean that a specific position or a range of positions are detected. For example, it can be detected that the output element is at the first, second, third, or fourth actuator position or at a certain point in the range from the first to the second actuator position or between the first and second, first and third, first and fourth, second and third, second and fourth, or third and fourth actuator positions. This applies similarly to the detection of other positions.

A control signal based on the feedback signal may then be sent from the control unit to the actuator. For example, the control unit controls the actuating torque and/or force (the torque, or the force, or the torque and the force) of the actuator and/or the speed of the output element and/or the speed of the wing tip portion using the control signal.

For example, the detector and the control unit may provide system control and monitoring enabling the desired operation of the wing arrangement or system based on manual and/or automatic commands and under safe conditions, and may provide any required wing arrangement or system position and health status to the cockpit and maintenance crew. The wing arrangement may be configured such that the control unit provides a control sequence to the motor, wherein the control sequence controls the motor in a power restricting range once the wing tip portion is close to the position in which the first end stop prevents the movement of the wing tip portion (once the output element or the wing tip portion have passed a defined threshold).

If a value is smaller than or equal to a level, the value may be constant over time or may vary over time. The value may rise and/or drop over time. The value may be zero or small or close to the level. If a value is greater than or equal to a level, the value may be constant over time or may vary over time. The value may rise and/or drop over time. The value may be large or close to the level. For example, the value may be in a predetermined range close to the level. In a range from a first position to a second position means that the positions between the two positions are included in the range as well as the first position and the second position. This applies to all ranges defined by positions accordingly.

The force/torque limitation may be achieved by e.g. not allowing displacement settings used for the normal operating range (second level, second speed level, and second displacement level) but to restrict them to a controlled maximum adequate to move the external loads which occur close to the end stops only. In other words, the wing arrangement is configured such that the actuator displacement setting is at a value below a first displacement level when the position of the output element is in a range from the first actuator position to the third actuator position, and that the actuator displacement setting is at a value larger than a second displacement level higher than the first displacement level when the position of the output element is between the third actuator position and the second actuator position as well as at the second actuator position or when the position of the output element is between the third and the fourth actuator position. Furthermore, the wing arrangement may be configured such that the actuator displacement setting is at a third displacement level lower than the second displacement level when the position of the output element is in a range from the second actuator position to the fourth actuator position.

The detector may be adapted to detect the position of the output element by detecting a position of the wing tip portion, and the control unit is adapted to control the actuating torque and/or force of the actuator based on the detected position of the wing tip portion, such that the actuating torque and/or force has a value smaller than or equal to the first level when the position of the wing tip portion is in a range from the first wing tip portion position to a third wing tip portion position, which is located between the first and second wing tip portion positions and corresponds to the third actuator position, and that the actuating torque and/or force has a value greater than or equal to the second level when the position of the wing tip portion is between the third wing tip portion position and the second wing tip portion position or when the position of the wing tip portion is the second wing tip portion position or when the position of the wing tip portion is between the third wing tip portion position and a fourth wing tip portion position, which is located between the second and third wing tip portion positions and corresponds to the fourth actuator position. This means, the control unit can control the actuating torque and/or force of the actuator in an additional way such that the actuating torque and/or force is reduced when the wing tip portion is positioned at the or closed to the first wing tip portion position. Therefore, the torque and/or force acting on the components of the wing arrangement is reduced.

The detector may be adapted to detect the position of the output element by detecting a force acting between the first end stop and the wing tip portion, and the control unit is adapted to control the actuating torque and/or force of the actuator based on the detected force acting between the first end stop and the wing tip portion, such that the actuating torque and/or force has a value smaller than or equal to the first level when the detected force is above a predefined value. The predefined value is reached when the output element of the actuator is in the third actuator position. Herewith, the control unit can control the actuating torque and/or force of the actuator when the first end stop abuts the wing tip portion. Therefore, the torque and/or force acting on the components of the wing arrangement can be further reduced.

Furthermore, the control unit may be adapted to control the speed of the output element during movement between the first and second actuator positions based on the detected position of the output element, such that the speed of the output element has a value smaller than or equal to a first speed level when the position of the output element is in a range from the first actuator position to the third actuator position, and that the speed of the output element has a value greater than or equal to a second speed level higher than the first speed level when the position of the output element is between the third actuator position and the second actuator position or when the position of the output element is the second actuator position or when the position of the output element is between the third actuator position and the fourth actuator position. Because of this, the control unit can control the speed of the output element such that the speed of the output element is reduced when the wing tip portion is positioned close to the first position. Therefore, a precise positioning and latching of the wing tip portion is possible.

The detector may be adapted to detect the position of the output element by detecting a position of the wing tip portion, and the control unit is adapted to control the speed of the wing tip portion during movement between the first and second wing tip portion positions based on the detected position of the wing tip portion, such that the speed of the wing tip portion has a value smaller than or equal to a first speed level when the position of the wing tip portion is in a range from the first wing tip portion position to the third wing tip portion position, which is located between the first and second wing tip portion positions, and that the speed of the wing tip portion has a value greater than or equal to a second speed level higher that the first speed level when the position of the wing tip portion is between the third wing tip portion position and the second wing tip portion position or when the position of the wing tip portion is the second wing tip portion position or when the position of the wing tip portion is between the third wing tip portion position and a fourth wing tip portion position located between the second and third wing tip portion positions. Herewith, the control unit can control the speed of the wing tip portion such that the speed of wing tip portion is reduced when the wing tip portion is positioned close to the first wing tip portion position. Therefore, a precise positioning and latching of the wing tip portion is possible.

Additionally, that the wing arrangement may comprise a second end stop for preventing movement of the wing tip portion beyond the second wing tip portion position. Hereby it is possible to provide a wing arrangement that can position the wing tip portion precisely in the extended position and in the folded position.

The control unit may be adapted to control the actuating torque and/or force of the actuator based on the detected position of the output element, such that the actuating torque and/or force has a value smaller than or equal to a third level smaller than the second level when the position of the output element is in a range from the second actuator position to the fourth actuator position. This means, the control unit can control the actuating torque and/or force of the actuator such that the actuating torque and/or force is reduced when the wing tip portion is positioned at the or closed to the second wing tip portion position. Therefore, the torque and/or force acting on the components of the wing arrangement is further reduced. Thereby, the components of the wing arrangement and the wing arrangement itself can be designed in an even more compact way.

Moreover, the control unit may be adapted to control the actuating torque and/or force of the actuator based on the detected position of the wing tip portion, such that the actuating torque and/or force has a value smaller than or equal to a third level smaller than the second level when the position of the wing tip portion is in a range from the second wing tip portion position to the wing tip portion fourth position. This means, the control unit can control the actuating torque and/or force of the actuator in an additional way such that the actuating torque and/or force is reduced when the wing tip portion is positioned at the or closed to the second wing tip portion position. Therefore, the torque and/or force acting on the components of the wing arrangement is reduced.

The detector may be adapted to detect the position of the output element by detecting a force acting between the second end stop and the wing tip portion, and the control unit is adapted to control the actuating torque and/or force of the actuator based on the detected force acting between the second end stop and the wing tip portion, such that the actuating torque and/or force has a value smaller than or equal to a third level smaller than the second level when the detected force is above a predefined value. Because of this, the control unit can control the actuating torque and/or force of the actuator when the second end stop abuts the wing tip portion. Therefore, the torque and/or force acting on the components of the wing arrangement can be further reduced.

In addition, the control unit may be adapted to control the speed of the output element during movement between the first and second actuator positions based on the detected position of the output element, such that the speed of the output element has a value smaller than or equal to a third speed level smaller than the second speed level when the position of the output element is in a range from the second actuator position to the fourth actuator position. Herewith, the control unit can control the speed of the output element such that the speed of the output element is reduced when the wing tip portion is positioned close to the second wing tip portion position. Therefore, a precise positioning and latching of the wing tip portion is possible.

Furthermore, the control unit may be adapted to control the speed of the wing tip portion during movement between the first and second wing tip portion positions based on the detected position of the wing tip portion, such that the speed of the wing tip portion has a value smaller than or equal to a third speed level smaller than the second speed level when the position of the wing tip portion is in a range from the second wing tip portion position to the fourth wing tip portion position. Herewith, the control unit can control the speed of the wing tip portion such that the speed of wing tip portion is reduced when the wing tip portion is positioned close to the second wing tip portion position. Therefore, a precise positioning and latching of the wing tip portion is possible.

According to a further embodiment, the wing arrangement comprises a coupling means, a bearing or a hinge, wherein the third end portion is pivotably connected to the second end portion via the coupling means. Hereby, the movement of the wing tip portion relative to the fixed wing portion is further supported by the coupling means.

The wing tip portion may be latched in the defined end positions, i.e. in the extended position or in the folded position. For example, the wing arrangement comprises a first latching means 36 for latching the wing tip portion in the first wing tip portion position. The wing arrangement may comprise a second latching means 38 for latching the wing tip portion in the second wing tip portion position. In order to optimize the latching mechanism and to allow the flight latching mechanism to be sized to flight loads, very accurate positioning of the wing tip portion is required. The first end stop can be implemented against which the system drives to ensure a defined system and wing tip portion position for latching, i.e. the first end stop prevents movement of the wing tip portion beyond the first or second wing tip portion position.

Driving into the first end stop unloads the power of the actuator onto the first end stop. The actuator, however, is sized to the maximum external load required to move under, considering a variety of environmental conditions, such as temperatures, and system component variations. Unloading the maximum actuator capability, translated through potentially used gear stages, during each positioning request drives the sizing of the wing arrangement.

The wing arrangement according to the present invention can be sized to move the wing tip portion under all required loads and under all conditions without unloading the full actuating torque/force on the first end stop and output stage of the wing arrangement once or multiple times during each operation. Especially, the wing arrangement is configured such that the external loads are reduced at every position where a first end stop is required.

A detector is provided, which is adapted to detect a required torque and/or force for the movement of the wing tip portion about the pivot axis before reaching the third actuator position or the third wing tip portion position when starting from the forth actuator position or fourth wing tip portion position, during movement of the wing tip portion between the third wing tip portion position and the fourth wing tip portion position. This detector may be the detector adapted to detect a position of the output element or a separate torque and/or force detector, such as, e.g., the actuator itself, or a swashplate of the actuator in the case of a hydraulic motor of the actuator or a torque sensor of the actuator. In any case, with such a detector, if the first level and/or the third level and/or the first speed level and/or the third speed level are determined based on the required torque and/or force. Additionally or alternatively, that the value of the actuating torque and/or force and/or the value of the speed of the output element and/or the value of the speed of the wing tip portion may be determined based on the required torque and/or force. It is also possible that the control unit is adapted to temporarily switch off the above-described control for reducing the torque and/or force upon reaching the third actuator position. Thereby it is possible to take high drag and efficiency losses into account and to provide a higher but still reduced actuating torque and/or force when the wing tip portion is close to or at the first and/or second wing tip portion position. It is also possible that the control unit is adapted to temporarily switch off the above-described control for reducing the torque and/or force upon reaching the third actuator position. Such a configuration takes into account situations, in which the required torque and/or force is so high that reducing the torque and/or force would cause stopping of the wing tip portion. A further aspect of the present invention relates to an aircraft comprising a wing arrangement according to the present invention.

The (first) wing arrangement may be secured to the fuselage of the aircraft on a first side of the aircraft and the aircraft comprises a second wing arrangement, which is secured to the fuselage of the aircraft on a second side of the aircraft and is essentially configured the same as the (first) wing arrangement. Furthermore, a second actuator or a second swashplate of the second actuator on a second hydraulic motor of the second actuator or a second torque sensor of the second actuator or a second detector of the second wing arrangement may be adapted to detect a second required torque and/or force for the movement of the wing tip portion of the second wing arrangement. The aircraft may be configured such that the (first) required torque and/or force and the second required torque and/or force are compared and that an external load level based on the comparison is determined. For example, the external load level may be determined based on the difference between the (first) required torque and/or force and the second required torque and/or force. The (first) required torque and/or force and the second required torque and/or force are detected during respective movements from the first positions to the second positions or from the second positions to the first positions, especially between the third and fourth positions, of the respective wing tip portions about the respective pivot axes of the (first) wing arrangement and the second wing arrangement, respectively. Thereby it is possible to determine the external load level from comparing one aircraft side with the other. For example, if there are large discrepancies between the required torque/load between the left and right hand-side, it may be assumed to stem from the external loads being aiding one side of the aircraft and opposing on the other side of the aircraft.

BRIEF DESCRIPTION OF THE DRAWINGS

For an understanding of embodiments of the disclosure, reference is now made to the following description taken in conjunction with the accompanying drawings, in which.

DETAILED DESCRIPTION OF SOME EMBODIMENTS

Some embodiments will now be described with reference to the Figures.

Figure 1:
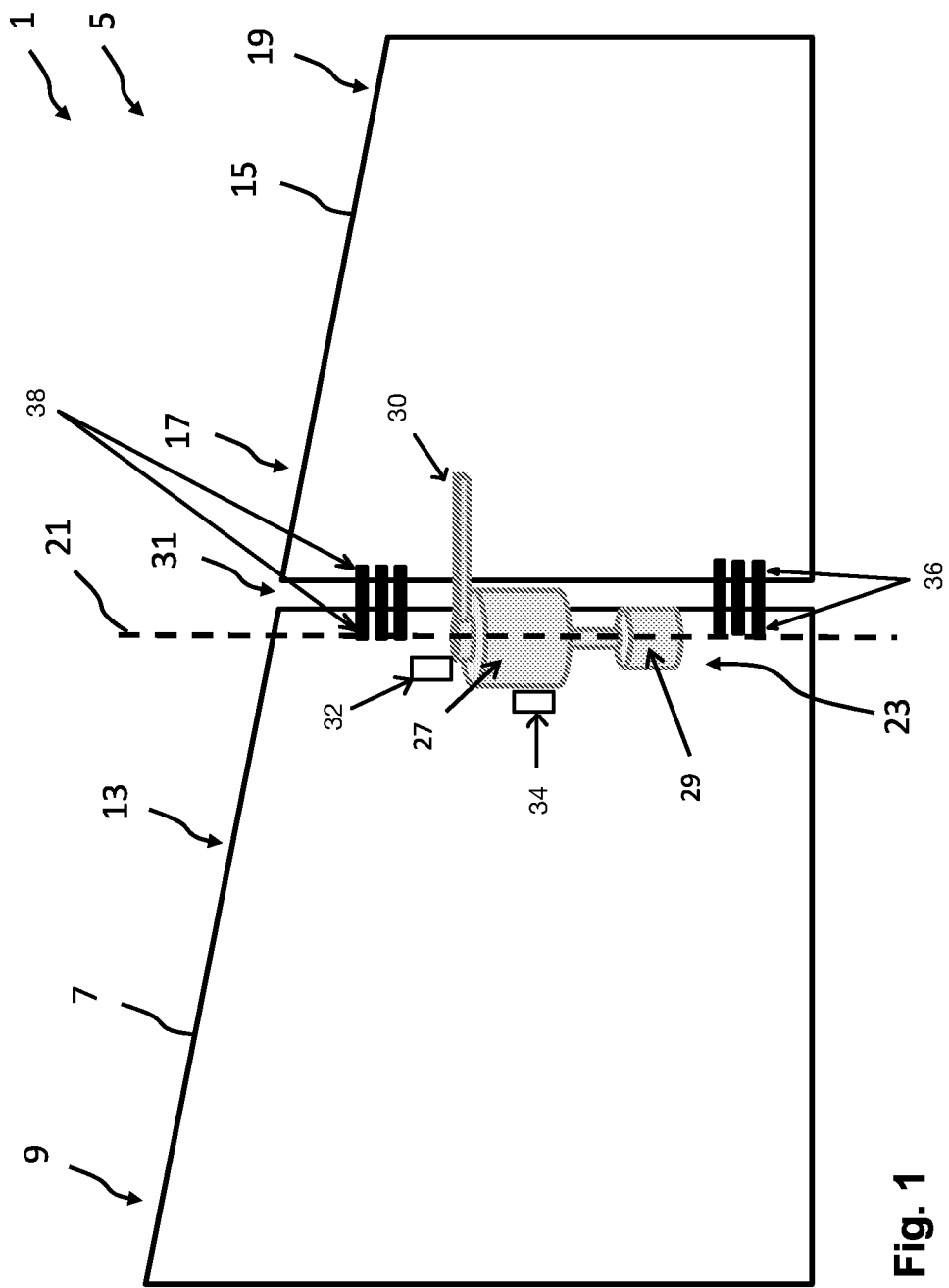
FIG. 1 is a schematic view of a wing arrangement according to an embodiment of the present invention.
Figure 2:
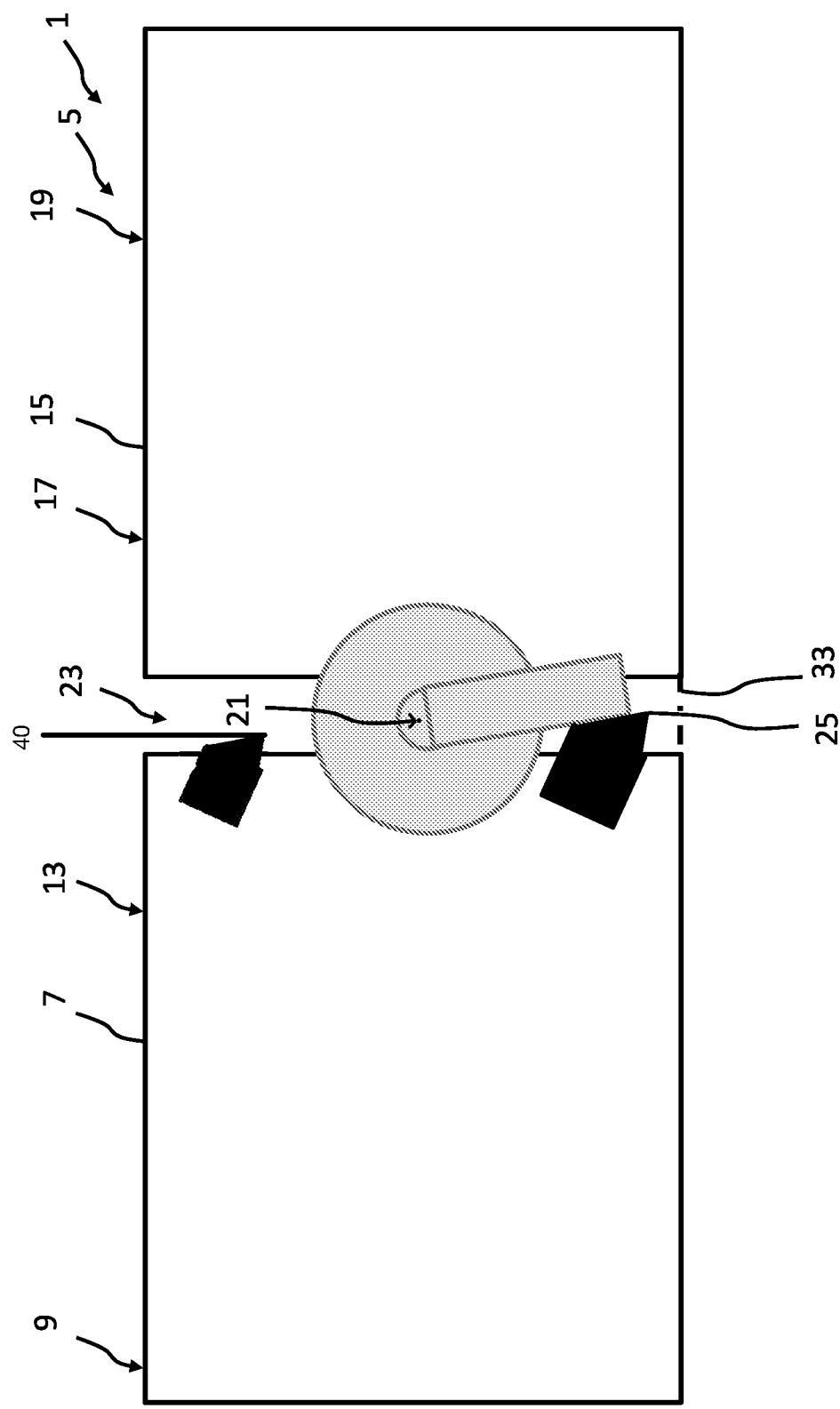
FIG. 2 is a schematic view of a wing arrangement according to the embodiment of FIG. 1; and, FIG. 3 is a schematic view of an aircraft according to an embodiment of the present invention.
Figure 3:
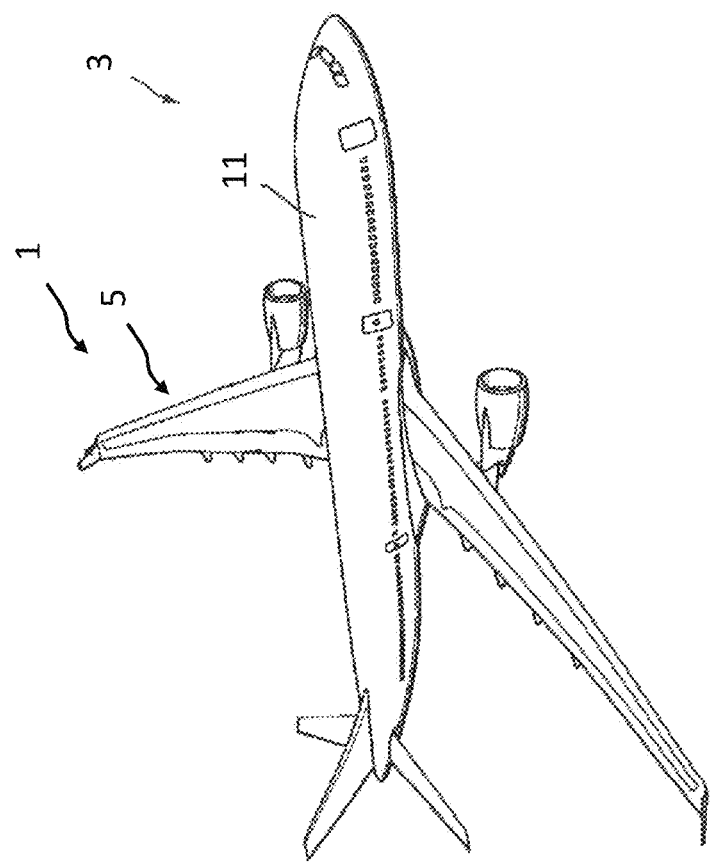

FIG. 1 shows a schematic view of a wing arrangement 1 for an aircraft 3 (the aircraft 3 is shown in FIG. 3) according to an embodiment of the present invention. The wing arrangement 1 shown in FIG. 1 comprises a wing 5, an actuator 23, a first end stop 25 (shown in FIG. 2), a second end stop 40, a detector 32, a control unit 34, a transmission component 29, and a motor 27.

The wing 5 of the embodiment shown in FIG. 1 comprises a fixed wing portion 7 and a wing tip portion 15. The fixed wing portion 7 comprises a first end portion 9 and an opposite second end portion 13, wherein the first end portion 9 is adapted to be secured to the fuselage 11 of the aircraft 3 (shown in FIG. 3). The wing tip portion 15 comprises a third end portion 17 and an opposite fourth end portion 19.

Furthermore, the third end portion 17 of the wing tip portion 15 is pivotably connected to the second end portion 13 of the fixed wing portion 7. The wing arrangement 1 shown in FIG. 1 is configured such that the wing tip portion 15 is selectively pivotable about a pivot axis 21 relative to the fixed wing portion 7 between a first wing tip portion position and a second wing tip portion position. In the embodiment shown in FIG. 1, the first wing tip portion position is an extended position and the second wing tip portion position is a folded position. The first wing tip portion position is shown in FIG. 1.

In addition, the actuator 23 comprises an output element 30, which is adapted to transfer an actuating torque and/or force to the wing tip portion 15 for actuating the wing tip portion 15 for movement about the pivot axis 21. The output element is movable between a first actuator position, in which the wing tip portion 15 is in the extended position, and a second actuator position, in which the wing tip portion 15 is in the folded position.

The wing arrangement 1 is configured such that the first end stop 25 of the embodiment of FIG. 1, an example of which is shown in FIG. 2, prevents the movement of the wing tip portion 15 beyond the extended position. Furthermore, the wing arrangement 1 is configured such the detector detects a position of the output element. In addition, the wing arrangement 1 is configured such the control unit controls the actuating torque and/or force of the actuator 23 based on the detected position of the output element. Herewith, the actuating torque and/or force has a value smaller than or equal to a first level when the position of the output element is in a range from the first actuator position to a third actuator position. The third actuator position is located between the first and second actuator positions. Furthermore, the actuating torque and/or force has a value greater than or equal to a second level higher than the first level when the position of the output element is between the third actuator position and the second actuator position or when the position of the output element is the second actuator position.

In the embodiment shown in FIG. 1, the pivot axis 21 is oriented substantially perpendicular to the wingspan direction of the wing 5 and substantially in the direction of flight of the wing 5/aircraft 3. The embodiment shown in FIG. 1 provides a wing arrangement 1 for a wing tip portion 15 pivoting around the pivot axis 21, e.g. a hinge line, oriented in the line of flight.

The actuator 23 shown in FIG. 1 enables the wing arrangement 1 to move the wing tip portion 15 into the desired wing tip portion position. The transmission component 29 shown in FIG. 1 is a gearbox.

The wing arrangement 1 shown in FIG. 1 comprises a coupling means 31, which may be a bearing or a hinge and which pivotably couples the third end portion 17 and the second end portion 13. In other words, the third end portion 17 is pivotably connected to the second end portion 13 via the coupling means 31.

FIG. 2 shows a schematic view of a wing arrangement 1 according to the embodiment of FIG. 1. FIG. 2 shows the first end stop 25, which prevents the movement of the wing tip portion 15 beyond the extended position shown in FIG. 2. The alignment of the fixed wing portion 7 and the wing tip portion 15 is shown in FIG. 2 with a dashed line, labeled with reference sign 33. The first end stop 25 in the embodiment shown in FIG. 2 is mounted to the second end portion 13 of the fixed wing portion 7 and abuts the actuator 23 and thereby prevents the movement of the wing tip portion 15 beyond the extended position.

FIG. 3 shows a schematic view of an aircraft 3 according to an embodiment of the present invention. The aircraft 3 comprises a wing arrangement 1 according to the present invention. The wing 5 of the wing arrangement 1 and the fuselage 11 of the aircraft 3 are shown in FIG. 3.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing arrangement for an aircraft, comprising:
   a wing having
      a fixed wing portion, with a first end portion, which is configured to be secured to a fuselage of the aircraft, and an opposite second end portion, and
      a wing tip portion with a third end portion and an opposite fourth end portion, wherein the third end portion is pivotably connected to the second end portion such that the wing tip portion is selectively pivotable about a pivot axis relative to the fixed wing portion between a first wing tip portion position and a second wing tip portion position, wherein the first wing tip portion position is one of an extended position and a folded position, in which a spanwise length of the wing is smaller than in the extended position, and a second wing tip portion position is the other one of the extended position and the folded position,
   an actuator comprising an output element adapted to transfer an actuating torque and/or force to the wing tip portion for actuating the wing tip portion for movement about the pivot axis, wherein the output element is movable between a first actuator position, in which the wing tip portion is in the first wing tip portion position, and a second actuator position, in which the wing tip portion is in the second wing tip portion position,
   a first end stop for preventing movement of the wing tip portion beyond the first wing tip portion position,
   a detector adapted to detect a position of the output element, and
   a control unit adapted to control the actuating torque and/or force of the actuator based on a detected position of the output element, such that the actuating torque and/or force has a value smaller than a first level when a position of an output element is in a range from the first actuator position to a third actuator position, which is located between the first and second actuator positions, and that the actuating torque and/or force has a value greater than a second level higher than the first level when the position of the output element is between the third actuator position and the second actuator position or when the position of the output element is the second actuator position or when the position of the output element is between the third actuator position and a fourth actuator position located between the second and third actuator positions.

2. The wing arrangement according to claim 1, wherein the detector is adapted to detect the position of the output element by detecting a position of the wing tip portion, and
   the control unit is adapted to control the actuating torque and/or force of the actuator based on the detected position of the wing tip portion, such that
      the actuating torque and/or force has a value smaller than the first level when the position of the wing tip portion is in a range from the first wing tip portion position to a third wing tip portion position, which is located between the first and second wing tip portion positions and corresponds to the third actuator position, and that
      the actuating torque and/or force has a value greater than the second level when the position of the wing tip portion is between the third wing tip portion position and the second wing tip portion position or when the position of the wing tip portion is the second wing tip portion position or when the position of the wing tip portion is between the third wing tip portion position and a fourth wing tip portion position located between the second and third wing tip portion positions and corresponding to the fourth actuator position.

3. The wing arrangement according to claim 1, wherein
the detector is adapted to detect the position of the output element by detecting a force acting between the first end stop and the wing tip portion, and
the control unit is adapted to control the actuating torque and/or force of the actuator based on the detected force acting between the first end stop and the wing tip portion, such that the actuating torque and/or force has a value smaller than the first level when the detected force is above a predefined value.

4. The wing arrangement according to claim 1, wherein
the control unit is adapted to control a speed of the output element during movement between the first and second actuator positions based on the detected position of the output element, such that
the speed of the output element has a value smaller than a first speed level when the position of the output element is in a range from the first actuator position to the third actuator position,
and that the speed of the output element has a value greater than a second speed level higher than the first speed level when the position of the output element is between the third actuator position and the second actuator position or when the position of the output element is the second actuator position or when the position of the output element is between the third actuator position and the fourth actuator position.

5. The wing arrangement according to claim 4, wherein
the detector is adapted to detect the position of the output element by detecting a position of the wing tip portion, and
the control unit is adapted to control a speed of the wing tip portion during movement between the first and second wing tip portion positions based on the detected position of the wing tip portion, such that
the speed of the wing tip portion has a value smaller than a first speed level when the position of the wing tip portion is in a range from the first wing tip portion position to a third wing tip portion position, which is located between the first and second wing tip portion positions and corresponds to the third actuator position, and that
the speed of the wing tip portion has a value greater than a second speed level higher that the first speed level when the position of the wing tip portion is between the third wing tip portion position and the second wing tip portion position or when the position of the wing tip portion is the second wing tip portion position or when the position of the wing tip portion is between the third wing tip portion position and a fourth wing tip portion position located between the second and third wing tip portion positions.

6. The wing arrangement according to claim 1, wherein the wing arrangement further comprises a second end stop for preventing movement of the wing tip portion beyond the second wing tip portion position.

7. The wing arrangement according to claim 1, wherein
the control unit is adapted to control the actuating torque and/or force of the actuator based on the detected position of the output element, such that the actuating torque and/or force has a value smaller than a third level smaller than the second level when the position of the output element is in a range from the second actuator position to the fourth actuator position.

8. The wing arrangement according to claim 1, wherein
the control unit is adapted to control the actuating torque and/or force of the actuator based on the detected position of the wing tip portion, such that the actuating torque and/or force has a value smaller than a third level smaller than the second level when the position of the wing tip portion is in a range from the second wing tip portion position to the fourth wing tip portion position.

9. The wing arrangement according to claim 1, wherein
the detector is adapted to detect the position of the output element by detecting a force acting between the second end stop and the wing tip portion, and
the control unit is adapted to control the actuating torque and/or force of the actuator based on the detected force acting between the second end stop and the wing tip portion, such that the actuating torque and/or force has a value smaller than a third level smaller than the second level when the detected force is above a predefined value.

10. The wing arrangement according to claim 1, wherein
the control unit is adapted to control a speed of the output element during movement between the first and second actuator positions based on the detected position of the output element, such that
the speed of the output element has a value smaller than a third speed level smaller than the second speed level when the position of the output element is in a range from the second actuator position to the fourth actuator position.

11. The wing arrangement according to claim 1, wherein
the control unit is adapted to control a speed of the wing tip portion during movement between the first and second wing tip portion positions based on the detected position of the wing tip portion, such that
the speed of the wing tip portion has a value smaller than a third speed level smaller than the second speed level when the position of the wing tip portion is in a range from the second wing tip portion position to the fourth wing tip portion position.

12. The wing arrangement according to claim 1, wherein the actuator comprises a motor and a transmission component.

13. The wing arrangement according to claim 1, wherein the wing arrangement comprises a first latching means for latching the wing tip portion in the first wing tip portion position.

14. The wing arrangement according to claim 1, wherein the wing arrangement comprises a second latching means for latching the wing tip portion in the second wing tip portion position.

* * * * *